United States Patent
Paul et al.

(10) Patent No.: US 10,747,911 B2
(45) Date of Patent: Aug. 18, 2020

(54) CONSTRAINED FLATTENING OF DESIGN DATA

(71) Applicant: Mentor Graphics Corporation, Wilsonville, OR (US)

(72) Inventors: Kevin Paul, Hyderabad (IN); Kamal Suruguchi, Hyderabad (IN); Kiran Bandela, Hyderabad (IN); Pranab Chakravarty, Secunderabad (IN)

(73) Assignee: Mentor Graphics Corporation, Wilsonville, OR (US)

( * ) Notice: Subject to any disclaimer, the term of this patent is extended or adjusted under 35 U.S.C. 154(b) by 725 days.

(21) Appl. No.: 14/615,644

(22) Filed: Feb. 6, 2015

(65) Prior Publication Data
US 2016/0171125 A1   Jun. 16, 2016

(30) Foreign Application Priority Data
Dec. 15, 2014   (IN) ............... 6300/CHE/2014

(51) Int. Cl.
| | | |
|---|---|---|
| *G06F 30/00* | (2020.01) | |
| *G06T 19/00* | (2011.01) | |
| *G06F 30/17* | (2020.01) | |
| *H05K 1/02* | (2006.01) | |

(52) U.S. Cl.
CPC ............ *G06F 30/00* (2020.01); *G06F 30/17* (2020.01); *G06T 19/00* (2013.01); *G06T 2219/021* (2013.01); *H05K 1/0283* (2013.01)

(58) Field of Classification Search
None
See application file for complete search history.

(56) References Cited

U.S. PATENT DOCUMENTS

| | | | | |
|---|---|---|---|---|
| 5,352,855 A * | 10/1994 | Potter | ............ | H02G 3/0481 174/135 |
| 5,506,950 A * | 4/1996 | Hughes | ............ | G06F 17/509 345/420 |
| 6,124,716 A * | 9/2000 | Kanamori | ............ | G01R 31/026 324/538 |
| 6,842,173 B2 * | 1/2005 | Sakakura | ............ | B60R 16/0207 345/419 |

(Continued)

OTHER PUBLICATIONS

T. van den Berg*, G. La Rocca* and M.J.L. van Tooren* "Automatic Flattening of Three-Dimensional Wiring Harnesses for Manufacturing" ICAS 2012, pp. 1-10 (Year: 2012).*

(Continued)

*Primary Examiner* — Kibrom K Gebresilassie
(74) *Attorney, Agent, or Firm* — Mentor Graphics Corporation (57) ABSTRACT

This application discloses a design system implementing tools and mechanisms to receive three-dimensional design data corresponding to a wire harness from a mechanical design tool. The tools and mechanisms can identify the three-dimensional design data includes a geometric description of one or more rigid or inflexible components in the wire harness, and convert or flatten the three-dimensional design data into a two-dimensional representation of the wire harness, such as a two-dimensional layout of the wire harness, which conforms with the geometric description of the one or more rigid or inflexible components in the wire harness.

9 Claims, 5 Drawing Sheets

(56) References Cited

U.S. PATENT DOCUMENTS

| | | | |
|---|---|---|---|
| 7,107,197 B1* | 9/2006 | Shropshire | B60R 16/0207 700/97 |
| 7,558,705 B1* | 7/2009 | Hughes | G06F 17/509 174/34 |
| 7,725,846 B2 | 5/2010 | Yvon et al. | |
| 8,694,952 B2* | 4/2014 | Holdsworth | G06F 17/5095 716/139 |
| 2003/0079197 A1* | 4/2003 | Pannala | G06F 17/509 716/102 |
| 2003/0126576 A1* | 7/2003 | Graham | G06F 17/509 716/126 |
| 2004/0019399 A1* | 1/2004 | Kabasawa | B60R 16/0207 700/121 |
| 2004/0029418 A1* | 2/2004 | Molinaro | H01R 9/2458 439/76.2 |
| 2004/0176862 A1* | 9/2004 | Tsuchiya | G06F 17/509 700/97 |
| 2004/0230403 A1* | 11/2004 | Tsuchiya | G06F 17/509 703/1 |
| 2005/0240383 A1* | 10/2005 | Hashima | B60R 16/0207 703/7 |
| 2007/0247456 A1* | 10/2007 | Yvon | B60R 16/0207 345/419 |
| 2007/0255544 A1* | 11/2007 | Yvon | B60R 16/0215 703/7 |
| 2009/0157209 A1* | 6/2009 | Holdsworth | G06F 17/5045 700/97 |
| 2009/0222121 A1* | 9/2009 | Flores | G06T 19/00 700/98 |
| 2013/0130540 A1* | 5/2013 | Oman | A41D 1/005 439/527 |
| 2014/0208585 A1* | 7/2014 | Betcher | H02G 1/085 29/748 |
| 2014/0313689 A1* | 10/2014 | Pickard | H01R 13/6666 361/818 |

OTHER PUBLICATIONS

E3.Harness Flattening—Fully integrated electrical and mechanical harness design, 2013 (Year: 2013).*

* cited by examiner

CONSTRAINED FLATTENING OF DESIGN DATA

RELATED APPLICATIONS

This claims priority under § 119 to Indian Patent Application No. 6300/CHE/2014, entitled "Constrained Flattening of Design Data," filed Dec. 15, 2014, which is incorporated herein by reference in its entirety.

TECHNICAL FIELD

This application is generally related to electronic design automation and, more specifically, to constrained flattening of three-dimensional design data into a two-dimensional layout of a wire harness.

BACKGROUND

Design of wire harnesses typically takes place in both three-dimensions and two-dimensions. For example, a three-dimensional (3D) mechanical computer aided design (MCAD) system is often used to hold the geometry definition of the wire harnesses. However, much of the actual design, engineering, pre-production, preparation of costs, and bills of material are all completed in a separate two-dimensional (2D) electrical computer aided design (ECAD) system. During the design process, the MCAD system often exports 3D design data, such as geometric harness data, to the ECAD system, which engineers use to finish the design. For example, the ECAD system can have a component library and tools needed to solve logical and electrical (rather than geometrical) problems.

The ECAD system can utilize the 3D design data exported from the MCAD system to generate 2D drawings of a corresponding wire harness, for example, by creating a layout of the wiring harness, an assembly board used to manufacture the wire harness, or the like. In some examples, the ECAD system can include a "flattening" program to convert the 3D design data into 2D design data, which the ECAD system can utilize to build a 2D representation or drawing of the wire harness described in the 3D design data. One common type of "flattening" is called "orthogonal flattening," which allows the ECAD system to lay out the wire harness by identifying and placing a backbone bundle of wires and then placing one or more branches of wire bundles at various junctions or nodes of the backbone. The ECAD system often elects to place the additional branches of wire bundles at an orthogonal angle from the backbone, but can also fan out the additional branches of wire bundles at a variety of different angles relative to the backbone. The ECAD system can then consider each of the branches as a separate backbone and place any additional branches of wire bundles at various junctions or nodes of these separate backbones.

While the "orthogonal flattening" process can effectively generate a 2D drawing or representation of a wire harness embodied in 3D design data, in some instances, the 2D drawing or representation of the wire harness can inadvertently misrepresent a geometric structure in the 3D design data. For example, when the MCAD system includes parts, such as T, Y or L pieces at bundle junctions, the "orthogonal flattening" can represent a geometric angle at a node or junction as a straight-line connection or vise versa. Since these T, Y or L pieces at bundle junctions are sometimes made of rigid or inflexible materials, when the resulting misrepresentation is carried through to the final assembly process, it may render the wire harness unmanufacturable, sometimes called a "harness misbuild," which can cause the design team to redesign and retest the design of the wiring harness.

SUMMARY

This application discloses a design system implementing tools and mechanisms to receive three-dimensional design data corresponding to a wire harness from a mechanical design tool. The tools and mechanisms can identify the three-dimensional design data includes a geometric description of one or more rigid or inflexible components in the wire harness, and convert or flatten the three-dimensional design data into a two-dimensional representation of the wire harness, such as a two-dimensional layout of the wire harness, which conforms with the geometric description of the one or more rigid or inflexible components in the wire harness.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
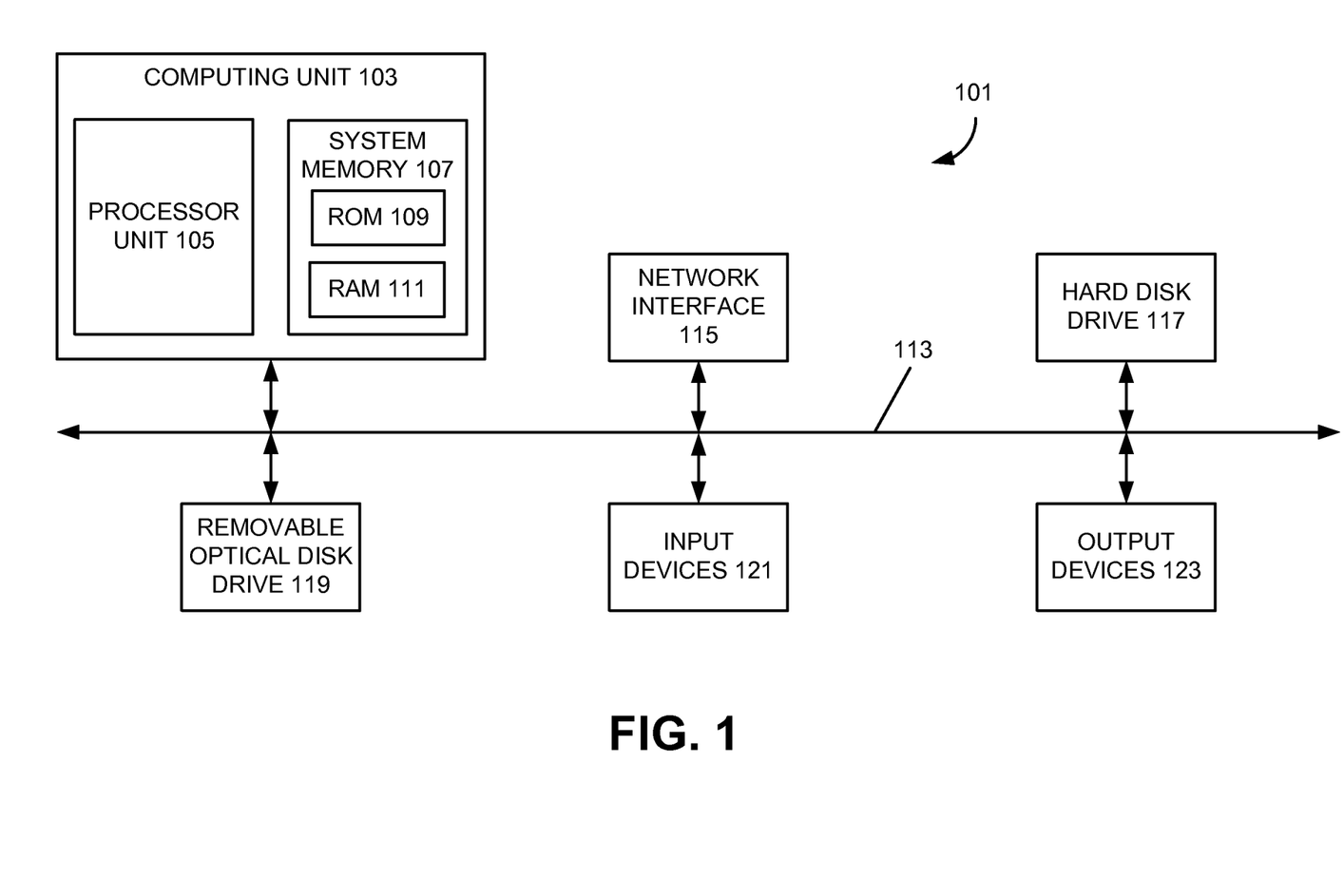
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
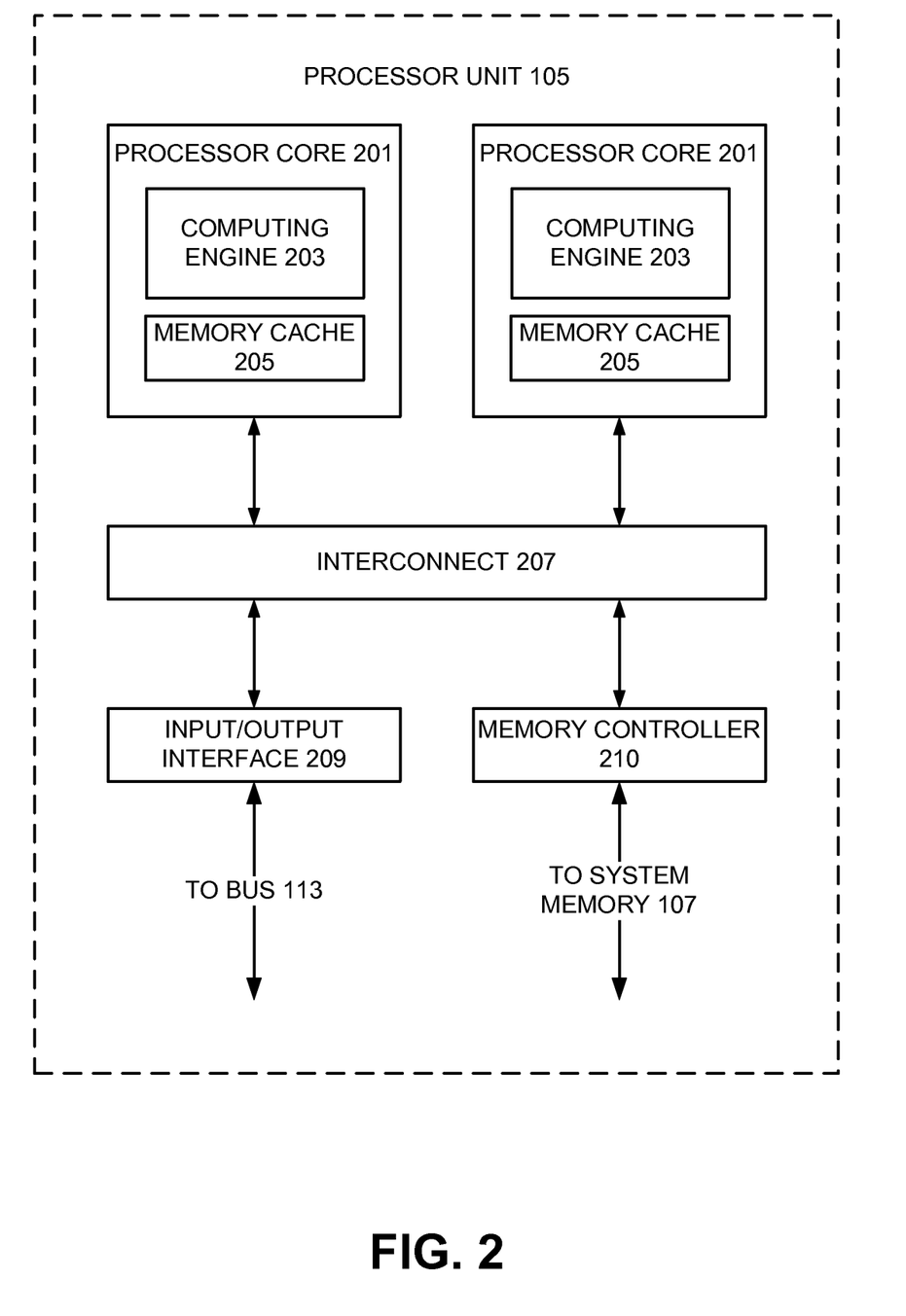

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Constrained Flattening of Design Data

Figure 3:
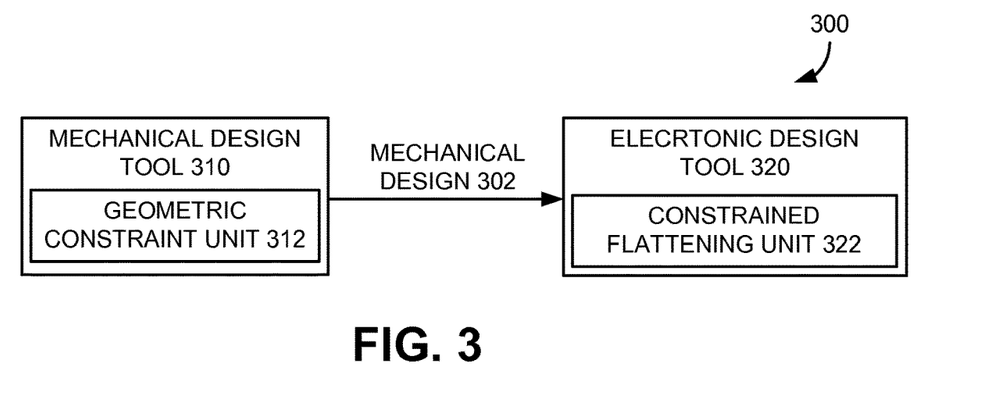
FIG. 3 illustrates an example design system including an electronic design tool capable of performing constrained flattening of design data from a mechanical design tool according to various embodiments of the invention.

FIG. 3 illustrates an example design system 300 including an electronic design tool 320 capable of performing constrained flattening of design data from a mechanical design tool 310 according to various embodiments of the invention. Referring to FIG. 3, the design system 300 can include a mechanical design tool 310, such as a mechanical computer aided design (MCAD) tool, to generate a mechanical design 302 of an electronic system, such as a wire harness. The mechanical design 302 can represent the electronic system in a data model describing various components in the electronic system and their associated connectivity with three-dimensional design data.

In some embodiments, the mechanical design tool 310 can include a geometric constraint unit 312 to generate geometric constraints for various components in the electronic system, which can be incorporated into the mechanical design 302. In some embodiments, the geometric constraint unit 312 can generate the geometric constraints for inflexible or rigid components in a wire harness design, such as T, Y, or L pieces located at branch junctions. The inflexible or rigid components in a wire harness design can be at least partially unbendable, stiff, inelastic, or the like, but may be components capable of some pliability, bendability, or like, while still generally retaining their original geometric shape or structure. In some embodiments, these geometric constraints can describe geometric relationships between wires or wire bundles at the branch junctions implemented by inflexible components in a wire harness. An example coding of geometric constraints for an inflexible or rigid component at a branch junction is shown below.

```
<flatteningconstraint value="orthogonal">
    <elementref value="<bundle id 1>"/>
```

-continued

```
        <elementref value="<bundle id 2"/>
    </flatteningconstraint>
    <flatteningconstraint value="collinear">
        <elementref value="<bundle id 1> "/>
        <elementref value="<bundle id 3"/>
    </flatteningconstraint>
    <flatteningconstraint value="collinear">
        <elementref value="<bundle id 2> "/>
        <elementref value="<bundle id 4"/>
    </flatteningconstraint>
```

The example coding identifies groups of wire bundles entering an inflexible or rigid component and different types of geometric relationships that exist between the different groups of wire bundles, such as an orthogonal relationship or a collinear relationship. Although the example coding illustrates two types of geometric relationships between groups of wire bundles, the coding can be modified to implement any number of different geometric relationships between the groups of wire bundles.

The design system 300 can include an electronic design tool 320 to receive the mechanical design 302 from the mechanical design tool 310. The electronic design tool 320 can utilize the mechanical design 302 to perform electrical design, networking design, or other design work for the electronic system. The electronic design tool 320 also can utilize the mechanical design 302 to perform verification operations on the electronic system, which can help ensure the electronic system functions as intended.

The electronic design tool 320 can include constrained flattening unit 322 to convert the three-dimensional design data in the mechanical design 302 into a two-dimensional layout representation of the electronic system described by the mechanical design 302. In some embodiments, the constrained flattening unit 322 can perform this conversion through a technique known as "flattening," which can generate the two-dimensional layout representation of the electronic system based on the topology or connectivity of the electronic system described in the mechanical design 302.

One common type of "flattening" is called "orthogonal flattening," which allows the constrained flattening unit 322 to generate a layout for an electronic system by iteratively identifying and placing different unplaced portions of the electronic system as backbones in the layout based on connectivity specified in the mechanical design 302. For example, when the electronic system is a wire harness, the constrained flattening unit 322 can perform "orthogonal flattening" of a corresponding mechanical design 302 by identifying one or more wire bundles as a backbone of the wire harness, placing the backbone in the layout, identifying at least one branch extending from the layout as placed, for example, the placed backbone, and then placing the branch (or branch backbone) in the layout at an angle, for example, orthogonally, away from the already placed backbone. This process can continue until the entire wire harness described in the mechanical design 302 has been converted into a two-dimensional representation and placed in the layout.

The constrained flattening unit 322 can determine which of the wire bundles in the wire harness constitute the backbone or branches in several different ways. For example, the constrained flattening unit 322 can identify a longest group of unplaced wire bundles as the backbone or branch. In other examples, the constrained flattening unit 322 can identify a thickest group of wire bundles as the backbone or branch.

Since the "flattening" process is a topology-based approach to layout generation, prior flattening systems would place each backbone along a common line or angle in the layout regardless of presence of inflexible components connecting wire bundles in the backbone. The constrained flattening unit 322, however, can identify a presence of inflexible components in the backbone or branches, for example, from geometric constraints in the mechanical design 302, which the constrained flattening unit 322 can utilize to guide the placement of the wire bundles in the backbone or branches in a layout of an electronic system. Examples of constrained flattening of the mechanical design 302 into a layout are described below in greater detail with reference to FIGS. 4A-4C.

Figure 4A:
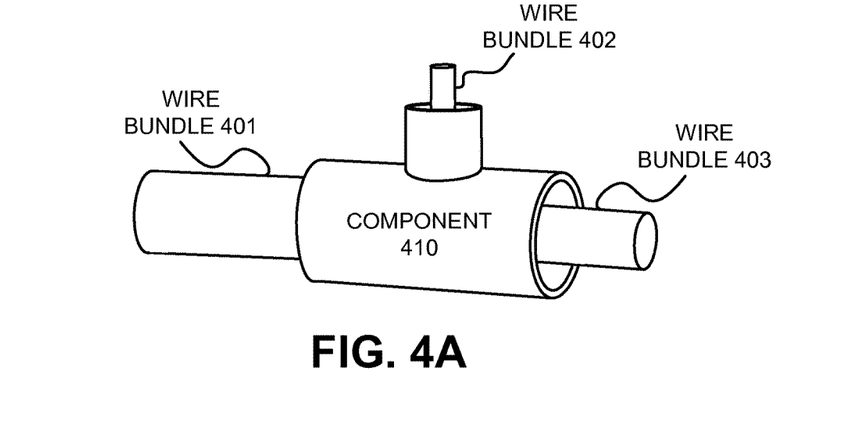
FIGS. 4A-4C illustrate an example implementation of constrained flattening of design data from a mechanical design tool according to various embodiments of the invention.
Figure 4B:
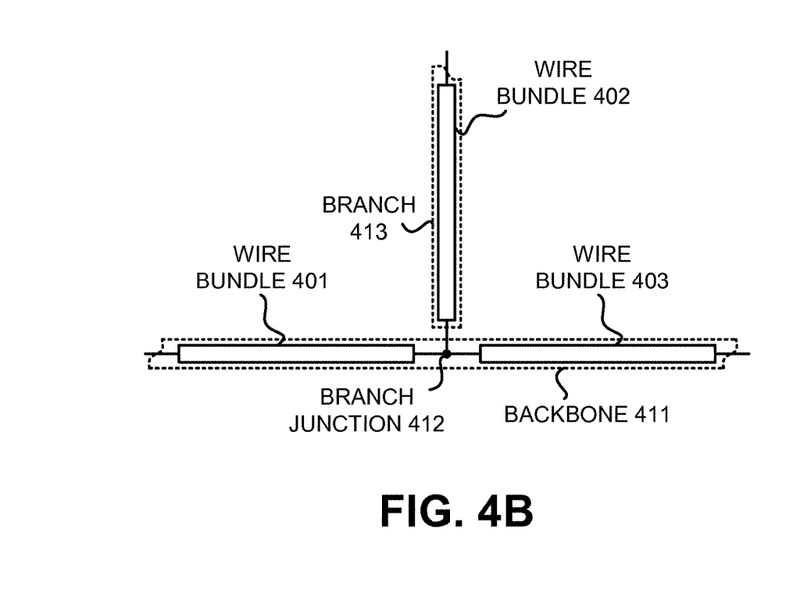
Figure 4C:
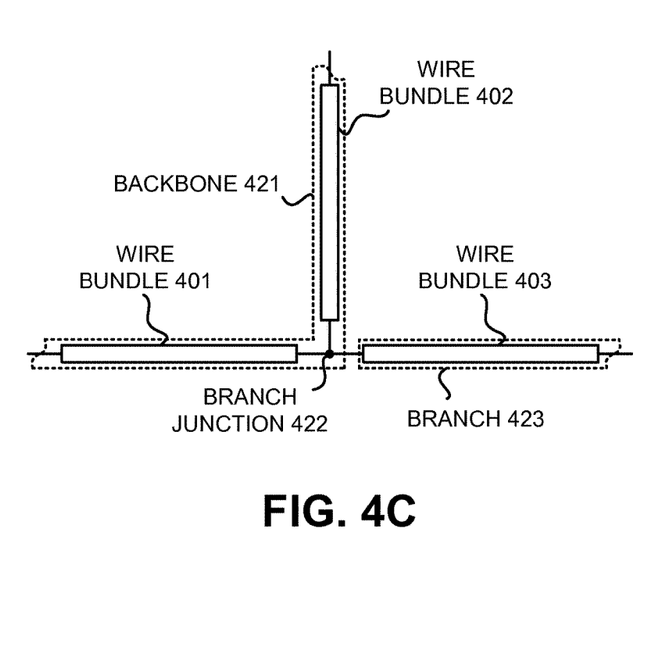

FIGS. 4A-4C illustrate an example implementation of constrained flattening of design data from a mechanical design tool according to various embodiments of the invention. Referring to FIGS. 4A-4C, a portion of a three-dimensional wire harness design is shown. The portion of the three-dimensional wire harness design can include a rigid or inflexible component 410, such as a T part, which can have multiple entry points for various wire bundles 401-403. For example, the structure of the entry points in the component 410 can have the wire bundles 401 and 403 located collinear to each other and orthogonally to wire bundle 402.

In an example, during constrained flattening of the wire harness, a backbone can be identified to include wire bundles 401 and 403 and two-dimensional representations of the wire bundles 401 and 403 can be placed in the layout as a backbone 411, as shown in FIG. 4B. Since the component 410 corresponds to a branch junction 412 in the wire harness, after the backbone 411 has been placed, wire bundle 402 can be identified as a branch 413, which can be placed in the layout at an orthogonal angle relative to the backbone 410. In some embodiments, when the branch junction 412 includes multiple additional branches, the branch 413 may be placed at a different fan-out angle, which can be based on a number of total branches at the branch junction 412 or the like.

In another example, during constrained flattening the of the wire harness, a backbone can be identified to include the wire bundles 401 and 402. Since the component 410 has be described as rigid or inflexible, the three-dimensional wire harness design can include geometric constraints for the component 410, for example, describing the wire bundles 401 and 403 as collinear to each other and orthogonal to wire bundle 402. Based on the identification of the wire bundles 401 and 402 as a portion of the backbone and the geometric constraints associated with the connectivity between the wire bundles 401 and 402, the two-dimensional representations of the wire bundles 401 and 402 can be placed in the layout as a backbone 421, as shown in FIG. 4C. Rather than placing the backbone 421 in a straight-line, as would have been performed by previous flattening processes, FIG. 4C shows the backbone 421 being placed with wire bundles 401 and 403 at different relative angles, which can be based on the geometric constraints of the component 410.

Since the component 410 corresponds to a branch junction 422 in the wire harness, after the backbone 421 has been placed, wire bundle 403 can be identified as a branch 423, which can be placed in the layout at an angle that corresponds to the geometric constraints of the component 410. In some embodiments, when the branch junction 412 includes multiple additional branches, the branch 413 may be placed at a different fan-out angle, which can be based on a number of total branches at the branch junction 412, or the like.

Figure 5:
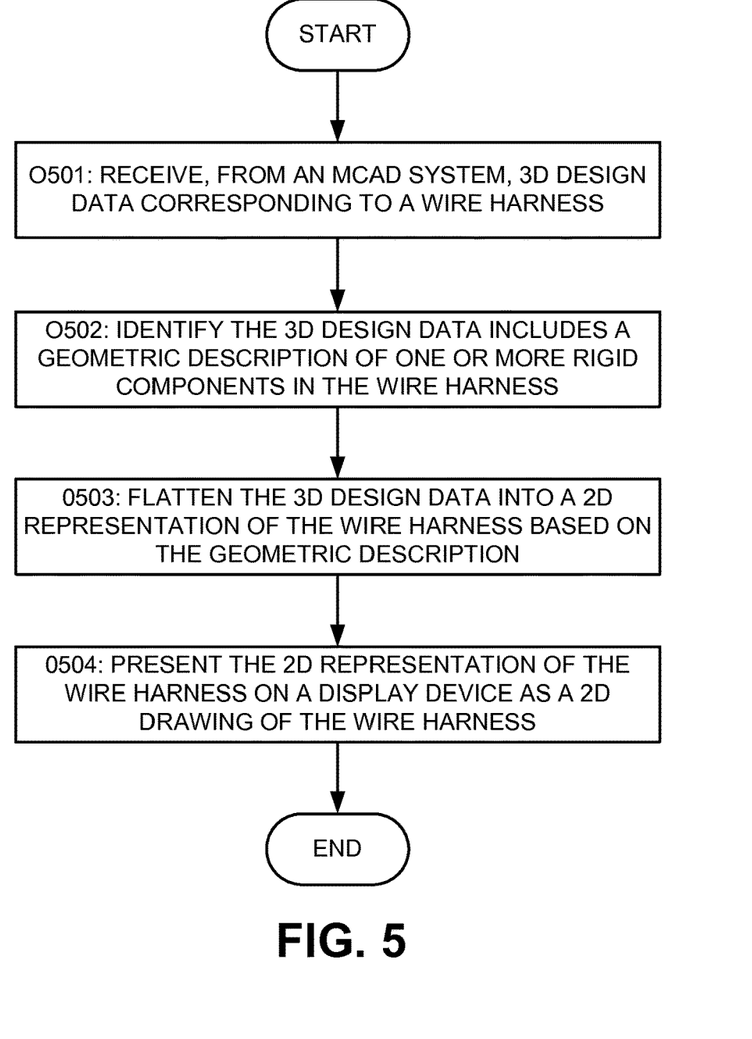
FIG. 5 illustrates a flowchart showing an example constrained flattening of design data from a mechanical design tool according to various embodiments of the invention.

FIG. 5 illustrates a flowchart showing an example constrained flattening of design data from a mechanical design tool according to various embodiments of the invention. Referring to FIG. 5, in a block 501, a computing system can receive, from a mechanical design tool, such as a mechanical computer aided design (MCAD) system, three-dimensional design data corresponding to a wire harness. In some embodiments, the three-dimensional design data can include geometric constraints for inflexible or rigid components in the wire harness, such as T, Y, or L pieces located at branch junctions. In some embodiments, these geometric constraints can describe geometric relationships between wires or wire bundles at the branch junctions implemented by inflexible components in a wire harness.

In a block 502, the computing system can identify the three-dimensional design data includes a geometric description of one or more rigid components in the wire harness. For example, the computing system can analyze the three-dimensional design data to locate geometric constraints associated with inflexible or rigid components in the wire harness. The computing system can parse geometric constraints to determine an orientation of different wires or wire bunches, relative to each other, at bundle junctions corresponding to locations of the inflexible or rigid components in the wire harness.

In a block 503, the computing system can flatten the three-dimensional design data into a two-dimensional representation of the wire harness that conforms with the geometric description of the one or more rigid components in the wire harness. The computing system can flatten the three-dimensional design data into the two-dimensional representation of the wire harness in a variety of different ways. For example, the computing system can generate a two-dimensional layout for the wire harness from the three-dimensional design data by iteratively identifying groups of one or more wire bundles as backbones of the wire harness and then placing them in the layout.

To ensure the placement of the wire bundles in the two-dimensional layout conforms to the geometric description of the one or more rigid components in the wire harness, the computing system can utilize the geometric constraints in the three-dimensional design data to determine relative orientations of wire bundles at branch junctions corresponding to the one or more rigid components in the wire harness and then place the wire bundles in the two-dimensional layout based on the relative orientations.

In a block 504, the computing system can present the two-dimensional representation of the wire harness on a display device as a two-dimensional drawing of the wire harness. In some embodiments, the two-dimensional representation of the wire harness can be a two-dimensional layout or drawing, which can be rendered graphically, for example, on a display device. If the computing system includes the display device, the computing system can present the two-dimensional layout or drawing on the display device. If, however, the display device is located externally from the computing system, the computing system can transmit the two-dimensional layout or drawing to the display device and prompt the display device to present the two-dimensional layout or drawing.

Figure 6:
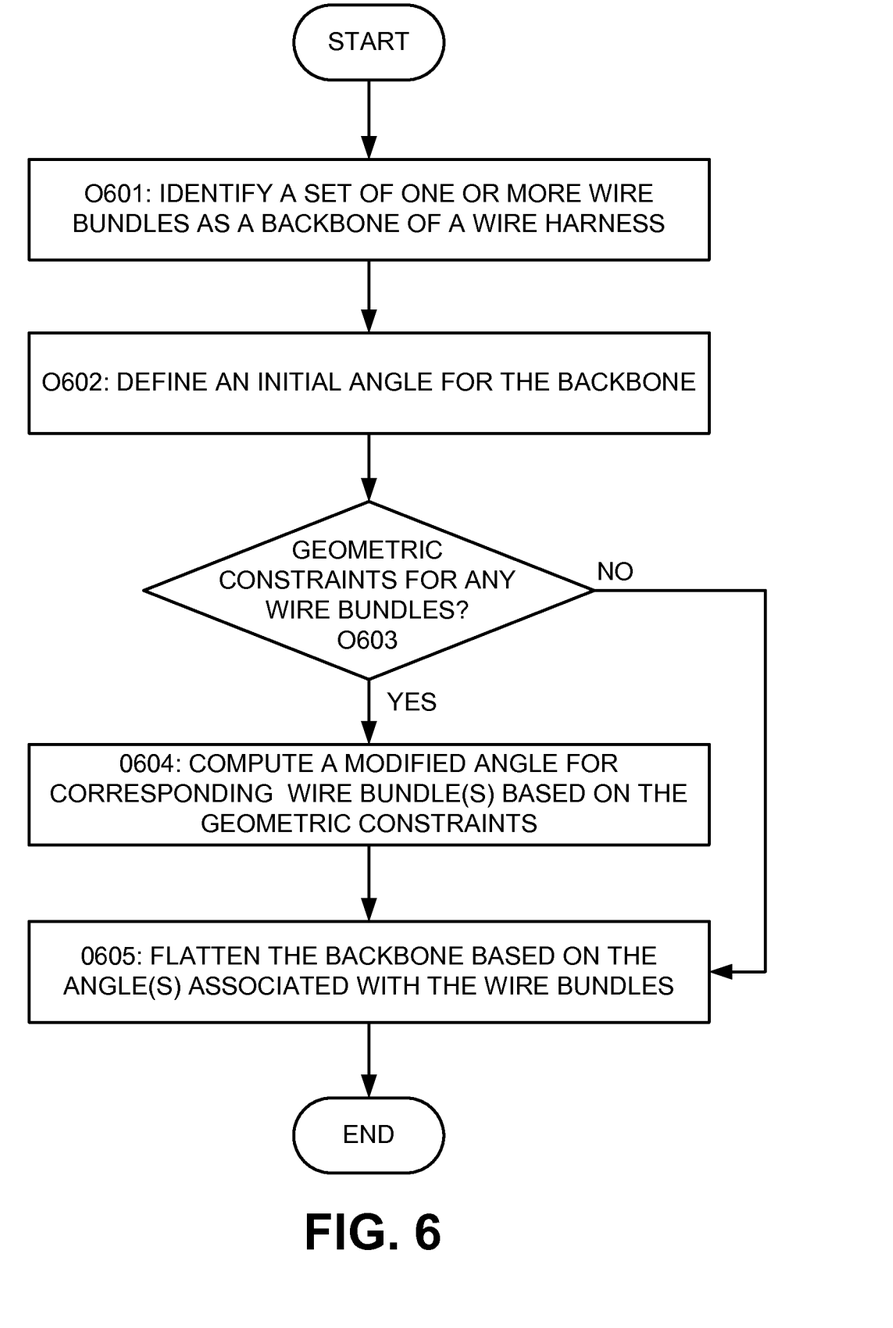
FIG. 6 illustrates a flowchart showing another example constrained flattening of design data from a mechanical design tool according to various embodiments of the invention.

FIG. 6 illustrates a flowchart showing an example constrained flattening of design data from a mechanical design tool according to various embodiments of the invention. Referring to FIG. 6, in a block 601, a computing system can identify a set of one or more wire bundles as a backbone of a wire harness. The computing system can receive, from a mechanical design tool, such as a mechanical computer aided design (MCAD) system, mechanical design data corresponding to the wire harness, which the computing system can analyze to identify the set of one or more wire bundles as the backbone.

The computing system can determine which of the wire bundles in the wire harness constitute the backbone in several different ways. For example, the computing system can identify a longest group of unplaced wire bundles as the backbone. In other examples, the computing system can identify a thickest group of wire bundles as the backbone.

In a block 602, the computing system can define an initial angle for the backbone. In some embodiments, the initial angle for the backbone can be horizontal in a flattened layout for the wire harness. If, however, other portions of the wire harness were previously placed in the flattened layout for the wire harness, the initial angle can be an angle relative to the portion of the wire harness the backbone connects with in the flattened layout for the wire harness. For example, the initial angle could be orthogonal to the portion of the wire harness that the backbone connects with in the flattened layout for the wire harness, or some other fan out angle from the portion of the wire harness.

In a decision block 603, the computing system can determine whether geometric constraints exist for any wire bundles in the backbone of the wire harness. The mechanical design data can include geometric constraints for inflexible or rigid components in the wire harness, such as T, Y, or L pieces located at branch junctions. In some embodiments, these geometric constraints can describe geometric relationships between wires or wire bundles at the branch junctions implemented by inflexible or rigid components in the wire harness. In some embodiments, the computing system can analyze the mechanical design data to locate the geometric constraints associated with inflexible or rigid components in the wire harness. When no geometric constraints exist, execution continues to a block 605; otherwise execution proceeds to a block 604

In the block 604, the computing system can compute a modified angle for corresponding wire bundle(s) based on the geometric constraints. The computing system, in some embodiments, can parse the geometric constraints to determine an orientation of different wires or wire bunches, relative to each other, at bundle junctions corresponding to locations of the inflexible or rigid components in the wire harness. Based on these relative orientations, the computing system can determine a modified angle for the corresponding wire bundle(s) in the backbone. In some embodiments, the initial angle can correspond to one or more of the wire bundles in the set, while the modified angle for the wire bundles can correspond to one or more of different wire bundles in the set.

In the block 605, the computing system can flatten the backbone based on the angle(s) associated with the wire bundles. The computing system can place the wire bundles in the flattened layout for the wire harness with an orientation relative to each other based on the initial angle and the modified angle. By placing various backbones in the flattened layout for the wire harness with an orientation that accurately represents an orientation of inflexible or rigid components in the mechanical design data for the wire harness, the computing system can utilize the flattened layout and the defined constraints of the wire harness for subsequent design work, such as electrical, network, or the like, or for subsequent verification operations, which can help ensure the wire harness functions as intended. In some embodiments, the computing system can store defined constraints as design objects for utilization in further downstream processing of the wire harness, such as is design rule checks, conditional rendering of design object graphics/symbols, or the like.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    receiving, by a computing system, three-dimensional design data corresponding to a wire harness;
    identifying, by the computing system, the three-dimensional design data includes a geometric description of a rigid component in the wire harness, wherein the geometric description defines the rigid component as including multiple entry points for wires into the rigid component of the wire harness and defines angular relationships between the entry points for the wires into the rigid component;
    flattening, by the computing system, the three-dimensional design data into a two-dimensional representation of the wire harness by selecting one or more wire bundles in the three-dimensional design data as a backbone for the two-dimensional representation of the wire harness, identifying that the rigid component corresponds to a portion of the wire bundles selected as the backbone, and determining a placement for the backbone based, at least in part, on the angular relationships between the entry points for the wires included in the geometric description of the identified rigid component in the wire harness; and
    presenting, by the computing system, the two-dimensional representation of the wire harness on a display device as a two-dimensional drawing of the wire harness.

2. The method of claim 1, wherein flattening the three-dimensional design data into the two-dimensional representation of the wire harness further comprises:

determining the identified rigid component in the wire harness is a branch junction associated with a branch wire bundle; and determining a placement for the branch wire bundle relative to the backbone based, at least in part, on the geometric description of the identified rigid component in the wire harness.

3. The method of claim 1, wherein the three-dimensional design data corresponding to the wire harness is received from a mechanical computer aided design system.

4. A system comprising:

a memory system configured to store computer-executable instructions; and a computing system, in response to execution of the computer-executable instructions, is configured to:

identify three-dimensional design data corresponding to a wire harness includes a geometric description of an inflexible component in the wire harness, wherein the geometric description defines the inflexible component as including multiple entry points for wires into the rigid component of the wire harness and defines angular relationships between the entry points for the wires into the inflexible component;

convert the three-dimensional design data into a two-dimensional representation of the wire harness by selecting one or more wire bundles in the three-dimensional design data as a backbone for the two-dimensional representation of the wire harness, identifying that the rigid component corresponds to a portion of the wire bundles selected as the backbone, and determining a placement for the backbone based, at least in part, on the angular relationships between the entry points for the wires included in the geometric description of the identified rigid component in the wire harness; and display the two-dimensional representation of the wire harness as a two-dimensional drawing of the wire harness.

5. The system of claim 4, wherein the computing system, in response to execution of the computer-executable instructions, is further configured to:

determine the identified inflexible component in the wire harness is a branch junction associated with a branch wire bundle; and determine a placement for the branch wire bundle relative to the backbone based, at least in part, on the geometric description of the identified inflexible component in the wire harness.

6. The system of claim 4, wherein the three-dimensional design data corresponding to the wire harness is received from a mechanical computer aided design system.

7. An apparatus comprising at least one computer-readable memory device storing instructions configured to cause one or more processing devices to perform operations comprising:

identifying three-dimensional design data corresponding to a wire harness includes a geometric description of a rigid component in a wire harness, wherein the geometric description defines the rigid component as including multiple entry points for wires into the rigid component of the wire harness and defines angular relationships between the entry points for the wires into the rigid component;

flattening the three-dimensional design data into a two-dimensional representation of the wire harness by selecting one or more wire bundles in the three-dimensional design data as a backbone for the two-dimensional representation of the wire harness, identifying that the rigid component corresponds to a portion of the wire bundles selected as the backbone, and determining a placement for the backbone based, at least in part, on the angular relationships between the entry points for the wires included in the geometric description of the identified rigid component in the wire harness; and prompting presentation of the two-dimensional representation of the wire harness on a display device as a two-dimensional drawing of the wire harness.

8. The apparatus of claim 7, wherein flattening the three-dimensional design data into the two-dimensional representation of the wire harness further comprises:

determining the identified rigid component in the wire harness is a branch junction associated with a branch wire bundle; and determining a placement for the branch wire bundle relative to the backbone based, at least in part, on the geometric description of the identified rigid component in the wire harness.

9. The apparatus of claim 7, wherein the three-dimensional design data corresponding to the wire harness is received from a mechanical computer aided design system.

* * * * *